United States Patent Office 3,576,590
Patented Apr. 27, 1971

3,576,590
SULFUR TREATMENT OF AROMATIC
POLYAMIDE SHAPED ARTICLES
Stephen S. Hirsch, Raleigh, N.C., assignor to
Monsanto Company, St. Louis, Mo.
No Drawing. Filed Sept. 22, 1967, Ser. No. 669,685
Int. Cl. D06m 3/06
U.S. Cl. 8—115.5                              9 Claims

ABSTRACT OF THE DISCLOSURE

Aromatic polyamide fiber, fabrics, and other shaped articles are converted into dimensionally stable fireproof products by constructive heat treatment at elevated temperatures with elemental sulfur under controlled conditions.

BACKGROUND OF THE INVENTION

According to this invention, temperature resistant aromatic polyamides can be partially reacted with molten sulfur to result in flameproof products that contain chemically bond sulfur.

The thermally stability requirements of organic polymers is constantly increasing with our advancing and more sophisticated technology. This has caused considerable research effort to be directed toward the preparation of thermally stable aromatic polyamides for use in the form of fibers, fabrics, paper and other shaped articles. These efforts have included heat treatment to form partly or completely carbonized or graphitized fibers, replacement of some of the aromatic rings with heterocyclic rings and substitution of fluorine and other atoms for hydrogen atoms in the polymer molecule. However, all of these efforts have failed to achieve a polymeric product which has acceptable high molecular weight, dimensional stability, flexibility and strength together with outstanding resistance to free flame.

SUMMARY OF THE INVENTION

This invention relates to a process for the transformation by heated sulfur of fibers, fabrics and other shaped articles having a high surface to volume ratio, derived from thermally stable aromatic polymers, into fireproof products having increased dimensional and thermal stability at elevated temperatures.

It has been found that when thermally stable aromatic polyamide compositions in the form of fibers, fabrics, papers, cellular plastics, or other shaped articles are reacted with sulfur at elevated temperatures under carefully controlled conditions, they become darkened and react with the sulfur and are transformed into fireproof, dimensionally stable products which retain the majority of their initial flexibility. The optimum time-temperature conditions of treatment are critical and dependent on the polymer composition, the structure of the article and the degree of resistance to flames desired. If treated below a certain temperature, the desired transformation will not occur, or occurs at too slow a rate to be practical and the product obtained will burn on exposure to flames; on the other hand, if heated at too high a temperature or for too long a time in the optimum temperature range, the products, although fireproof, become embrittled and lose some of their desirable physical properties.

Articles processed within the range of conditions specified in this invention can withstand direct exposure to the flames of a Meker burner for short periods of time without deterioration. The products, when fibers or fabrics are used, are sufficiently flexible and dimensionally stable to permit use in practical applications requiring a high degree of thermal oxidative stability, such as, for example, heat shields, supports for ablative materials, and outer layers for materials that are subjected to exposure by flames for short periods of time. In addition, these materials may be used in filters, such as for the filtration of sulphuric acid solutions, because of their chemical inertness.

DETAILED DESCRIPTION AND PREFERRED EMBODIMENTS

In the practice of the invention the process may be applied to any of the polyamides designated in the prior art as "wholly aromatic" polyamides. These polyamides may be characterized by the recurring structural unit

wherein $Ar_1$ and $Ar_2$ are divalent unsaturated essentially carbocylic ring radicals in which the chain extending bonds connecting $Ar_1$ and $Ar_2$ to nitrogen atoms and carbonyl groups respectively are attached to non-adjacent carbon atoms. The terms "unsaturated essentially carbocyclic ring" as used herein is intended to refer to any "aromatic ring system" which is of the arylene or modified arylene-heterocyclic type. The term arylene refers to single, multiple, and fused ring residues, such as phenylene, biphenylene and naphthalene.

$Ar_1$ and $Ar_2$ may be the same or different and may be an unsubstituted divalent aromatic radical or a substituted divalent radical; the substituents being attached to the rings being chosen from nitro, halogen, lower alkyl groups and the like. In the above formula either one or both of the Ar groups may contain optionally linkage other than carbon-carbon, such as

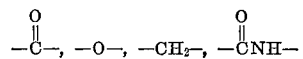

—$SO_2$— and the like. Additionally, $Ar_1$ may contain internal carbonamide linkages such as

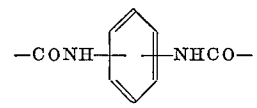

and the like.

Typical polymers of this type structure are the wholly aromatic polymers such as those disclosed in U.S. 3,063,966; 3,232,910; 3,242,213; 3,006,899 and various heterocyclic polymers such as those described in U.S. 2,895,948; 2,904,537 and 3,004,994. Others are described by Culbertson et al., J. Polymer Sci. B-4, 249 (1966). In addition, it has now been found that ordered, wholly aromatic polymers have exceptionally high thermal stability, and furthermore, that in these —AA—BB— type ordered polymers, the use of symmetrical AA and BB units results in vastly improved mechanical and thermal properties. Typical of such polymers are those described in Belgian Pats. 650,774 and 660,339.

A preferred methnd for the preparation of these polymer compositions is by means of the low temperature solution reaction of an aromatic diamine with an aromatic diacid halide as described in numerous patents and publications. Polymers useful in the process of this invention may be prepared interfracially or in solution, following the general procedures described in the literature. These polymers may be prepared conveniently and preferably by reacting an aromatic diamine with an aromatic diacid halide in a lower alkylamide solvent such as dimethylacetamide.

Polymers useful in the practice of this invention may be converted to fibers by well known spinning techniques such as dry, wet, or dry-jet-wet spinning methods. The high melting points of most of these polymers prevents the use of melt spinning techniques. The dry spinning method is amply described in numerous patents, the dry-jet-wet spinning techniques useful in the preparation of fibers from these polymers are described in Belgian Pat. 665,638.

Although the exact mechanisms of the reactions responsible for the transformation that takes place within the polymer during the process are not fully understood; in all probability, these consist, at least in part of hydrogen abstraction followed by coupling of the residual radicals thus formed, to give ring formation and perhaps cross-linking. Substitution by sulfur occurs simultaneously, resulting in semi-carbonized products containing sulfur being obtained.

In addition to the reactions resulting in the desired transformation, it is also possible for other destructive degradation reactions to occur, which result in the breakdown of the polymer with the loss of physical structure and properties. It is probable that the type and rate of thermal decomposition reactions or processes that will occur in a given polymer during the process of this invention are dependent on and determined by the values of the energies of activation for the particular individual reactions with respect to a particular polymer structure. In order that the desired transformation reactions take place, to the exclusion of undesirable degradation reactions, and without substantial change taking place in the physical structure of the polymer or fiber, it is necessary that the desired reactions begin and progress to a substantial extent at a temperature below the softening point, or temperature at which undesirable physical changes begin to occur within the polymer. The optimum process conditions, minimizing the undesirable reactions, and enhancing those reactions leading to products having the superior properties attainable by the process of this invention will vary to some extent with respect to the composition of the polymer being treated and its physical form (i.e. fiber, film, fabric or shaped article).

This unexpected achievement of non-melting and fireproof organic shaped articles by the process of this invention is not brought about merely by incorporation of sulfur into the highly aromatic polymer. The sulfur pick-up by the polymer is believed to be largely incidental to the properties obtained. Instead, it is believed that the unexpected effect of the oxidant is the result of at least three processes. One, exposure of the polymer to sulfur results in controlled reaction of easily oxidizable portions of the polymer molecule with the element rather than vigorous uncontrollable burning which occurs when conventional materials are thrust into a flame. Two, the reaction of the polymer with the sulfur results in controlled crosslinking of the polymer as evidenced by diminished elongation and by insolubility. The resulting structuration of the molecules diminishes the tendency for small volatile fragments to be broken off upon being thrust into a flame, these fragments themselves burning and being observed as fire. Three, sufficient reactive sites remain on the polymer so that upon being thrust into a flame, extensive crosslinking and condensation reactions occur, giving rise to carbonaceous residues of the same shape as the original article. The in situ generated carbonaceous form resists temperature of at least 3,000° C. It must be noted that if sulfur were introduced into the polymer by employment of sulfur-containing monomers, none of the above processes would be expected to occur and the resulting polymer would behave conventionally upon being thrust into a flame.

Factors affecting the rate of conversion to the fireproof condition are polymer composition, temperature, time of exposure to the molten sulfur and in the case of fabrics, for example, the type of weave, denier per filament and fabric weight or thickness. The optimum conditions to be used in the practice of this invention are dependent upon the above factors and, in addition, to the degree of flame resistance and physical properties desired in the end product. When carrying out the process of this invention, using a given sample and set of conditions, the article being treated will first become flame resistant, on continued exposure it will become flameproof, and finally fireproof. After becoming fireproof, continued exposure will cause a progressive deterioration in the properties of the article, the rate of deterioration being dependent upon the severity of the conditions.

The term "fireproof" denotes the absence of burning and resistance to destruction of the article on direct exposure to hydrocarbon flames, such as from a Meker burner, for periods in excess of one minute. A fabric will retain its structural integrity initially, but will slowly be consumed on long and continued exposure to flame.

The term "flameproof" or "nonflammable" denotes that on exposure to direct flame, an initial flashoff may occur resulting in the conversion of the article to a fireproof product. Further, the article will not support combustion and will retain its structural integrity, as well as dimensional stability on exposure to flames. The dimensional stability of flameproof fabrics will not be quite as good as that of fireproof fabrics.

The term "flame-resistant" denotes that the article on direct exposure to flame will burn very slowly, in comparison to the untreated article with some loss of structural integrity, and further that will burn only while exposed to the flame. In the case of fiber and fabric, the material will soften, fuse and burn slowly.

The term "structural integrity" denotes that the physical form (and shape) of the article will not be changed to an appreciable extent. In the case of fibers and fabrics the individual filaments will remain distinguishable under the microscope after exposure to flame. The main implication of this term is that filament fusion does not occur.

"Dimensional stability" means that the size of the shaped article does not change appreciably on exposure to flames. In the case of fabric, a one square inch piece of fabric will shrink very slowly on exposure to flame, retaining better than 90% of its original dimensions for reasonable periods of exposure.

"Flexible" means that, in the case of fibers or fabrics, the article may be bent to the desired shape for fabrication without loss of physical properties. Further, the fibers or fabrics may be flexed with only a small percentage of the individual filaments being broken.

In the actual practice of this invention, the conditions of time, temperature, and rate of heating can be varied and the set of conditions necessary to give optimum results for a given polymer system are easily determined by experiment.

For example, let us assume that one wishes to convert a fabric of a given construction, derived from a particular polymer composition, to a product capable of withstanding flames of a certain intensity, for a given period of time. It is recommended that small samples of fabric be heat treated in molten sulfur as described in this invention under a given set of conditions and the products obtained tested. As a result of a few well chosen experiments, it should be possible to arrive at a set of conditions for treating the samples that will give the desired result.

Within limits, higher treatment temperatures shorten the time required for a given degree of conversion. Time-temperature treatment conditions must be chosen for a given polymer composition and physical form, such that the rate of transformation will not occur so rapidly that the physical structure will be disrupted.

Other methods for carrying out the process of this invention may be used equally as well as the method described herein. Almost any type of furnace apparatus, capable of being heated to 200-500° C., and provided with the means for treating the shaped article with molten sulfur may be used. The apparatus and method described herein and used in the reduction to practice is a simple embodiment of the invention. The process could be adapted for the treatment of fiber or fabric to a continuous process in which one or more high temperature heating towers or troughs are used, and the material passed through the apparatus at a controlled rate and tension. Alternatively, the shaped articles of this invention may be exposed to the vapors of heated sulfur, rather than to the melt, to obtain the fireproof products. In the case of cellular compositions, it is advisable to incorporate finely divided sulfur into the polymer prior to foaming. The resulting sulfur-containing foams may then be heated to produce the fireproof articles. In an alternate embodiment, the sulfur-containing aromatic polyamide foams may be employed without a heat treatment; exposure to adventitious flames being sufficient to bring about reaction and create the fireproof foams in situ.

As one example of a useful application of this invention, the products obtained may be used in flame resistant composite or non-woven structures. In applications such as these, fibers may be used rather than fabrics and pre-oxidized prior to fabrication, or the woven fabrics themselves can be treated.

Other possible end uses for products of this invention are high temperature insulation, filtration media, protective clothing and curtains and laminated structures.

Finally, the process described in this invention may be very useful as a means for the preparation of precursors for conversion into completely carbonized or graphitized fibers. The advantage of the process of this invention as a preliminary step in the preparation of carbonized or graphitized fibers lies in the fact that the structural integrity of the fibers are maintained throughout the process. It should be possible to convert fibers in this form into carbon or graphite fibers having superior structural forms and properties.

The invention is further illustrated by the following examples in which all parts and percents are by weight unless otherwise indicated. In the examples PBT is poly-m-phenylenebis(m-benzamido)terephthalamide, PPI is poly-m-phenylene isophthalamide and BOT is poly-2,5-bis-(p-aminophenyl)-1,3,4-oxadiazole terephthalamide.

EXAMPLE 1

A sample of PBT tape (2 d.p.f.) was affixed to a glass rod and immersed in molten sulfur at 150° C. The sulfur was heated in a resin kettle under nitrogen. The temperature was then raised at a rate of 4° C./min. to 365° C. and maintained at this temperature for a period of 63 min. The mixture was allowed to cool to 250° C. and the tape removed. Excess liquid sulfur was removed by shaking, followed by washing in carbon disulfide. The remaining sulfur was removed by vacuum sublimation, the tape submitted for chemical analysis. The results of this analysis were as follows:

| Before treatment: | After treatment |
|---|---|
| C=68.34 | 57.17 |
| H=4.50 | 3.17 |
| N=11.4 | 9.20 |
| S= — | 23.41 |
| O by difference 15.76 | 7.05 |

From the above results, it can be clearly seen that an entirely new composition of matter was formed and that in addition to other effects, sulfur has replaced a considerable portion of the oxygen.

A sample of the above tape, on direct exposure to the flames of a Meker burner, became red hot, but retained its structural integrity and dimensional stability. On exposure to the flames of an oxyacetylene blowtorch, the sample became white hot, but still retained its structural integrity and dimensional stability. By comparison, this blowtorch flame cuts through asbestos papers and fabrics almost instantly.

Fibers, from which the tape was woven, were sewn to the tape and thus exposed to the same treatment. Physical properties were measured on those fibers before and after treatment and the results were as follows:

| Before treatment: | After treatment |
|---|---|
| Den. 2.48 | Den. 2.74. |
| Ten. 5.93 | Ten. 4.89. |
| Elong. 22.9 | Elong. 5.46. |
| Mi 103 | Mi 121. |

The very high modulus and tenacity of the above treated fibers are particularly noteworthy.

EXAMPLE 2

A tape of PPI was treated in the same manner as described in Example 1 at 343° C. for a period of 4800 sec. After removal of unreacted sulfur in the manner described, the attached fibers were removed and found to have the following properties: Den. 3.14; Ten. 3.21; Elong. 8.3; Mi 68.

The treated tape was fireproof, dimensionally stable at high temperatures and flexible. An untreated control sample was consumed by the flame.

EXAMPLE 3

A sample of BOT fiber was immersed in molten sulfur at 150° C., in a resin kettle under nitrogen. The temperature was then raised to 380° C. and maintained at this temperature for 2 hours. The mixture was allowed to cool to 250° C. and then removed. Excess liquid sulfur was removed by shaking, followed by washing in carbon disulphide. The remaining sulfur was removed by vacuum sublimation.

Fiber physical properties after the treatment were: Den. 12.6; Ten. 4.30; Elong. 3.8; Mi 150.

The sample was flameproof, dimensionally stable at high temperatures and flexible. A sample of untreated control fiber was consumed by flame.

EXAMPLE 4

A sample of BOT fiber was immersed in molten sulfur at 150° C. in a resin kettle under nitrogen. The temperature was then raised to 395° C. for 2 hours. The fiber was removed after cooling and the excess unreacted sulfur removed as in Example 3 above.

Physical properties measured after treatment were: Den. 12.6; Ten. 4.17; Elong. 3.72; Mi 162.

The sample was almost fireproof, of greater dimensional stability than the product of Example 3 at high temperatures and flexible. A sample of untreated control fiber was consumed by flame from a Meker burner.

EXAMPLE 5

A sample of tape derived from PBT was treated as in Example 1 with molten sulfur at 380° C. for 1 hour. After removal of the excess sulfur, using the method described previously, the tape was exposed to the flame of a Meker burner for about 1 minute. The temperature of the flame was about 1200° C. The tape became red hot, but retained its structural integrity, and did not shrink. Upon being thrust into the hottest portion of an oxygen acetylene blowtorch flame, the tape glowed white hot but did not burn through in ten seconds. A sample of untreated tape was consumed by the same flame; a sample of asbestos cloth was instantly cut into two parts by the flame and porcelain rod, on exposure to the flame became molten, flowed, and was subsequently vaporized. After exposure to the blowtorch flame, the tape was still flexible and diminished only slightly in size.

EXAMPLE 6

A sample of PBT fiber was treated with molten sulfur, under the conditions described in Example 1.

The fiber samples were divided into two parts. One sample was exposed to the flame of a Meker burner for 30 seconds; the other was not exposed.

Both samples were converted to graphite with retention of fiber identity on heating to >2900° C. in argon atmosphere in a furnace. X-ray diffraction measurements confirmed the graphite structure.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A process for providing a fireproof, dimensionally stable and flexible product from a wholly aromatic polyamide shaped article characterized by the recurring structural unit

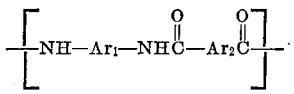

wherein $Ar_1$ and $Ar_2$ are divalent unsaturated essentially carbocylic ring radicals in which the chain extending bonds connecting $Ar_1$ and $Ar_2$ to nitrogen atoms and carbonyl groups respectively are attached to non-adjacent carbon atoms, the steps which comprise:

(1) heating said shaped article in the presence of elemental sulfur, to a temperature below its softening point but sufficiently high to effect reaction with said elemental sulfur, said temperature falling within the range of from about 200° C. to about 500° C.

(2) causing the said reaction to take place for a time sufficient to render said shaped article fireproof.

2. The process of claim 1 wherein the polyamide is poly-m-phenylene bis(m-benzamido)terephthalamide.

3. The process of claim 1 wherein the polyamide is poly-m-phenylene isophthalamide.

4. The process of claim 1 wherein the sulfur is used in the molten state.

5. The process of claim 1 wherein the sulfur is used in the vapor state.

6. The process of claim 1 wherein the sulfur is dispersed in the shaped article.

7. A fireproof product, which retains its dimensional stability upon exposure for at least about ten seconds to an open hydrocarbon flame, said product being the reaction product of a wholly aromatic polyamide characterized by the recurring structural unit

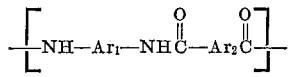

wherein $Ar_1$ and $Ar_2$ are divalent unsaturated essentially carbocylic ring radicals in which the chain extending bonds connecting $Ar_1$ to $Ar_2$ to nitrogen atoms and carbonyl groups respectively are attached to non-adjacent carbon atoms, and elemental sulfur.

8. The shaped article of claim 7 in the form of fibers.

9. The shaped article of claim 7 in the form of fabrics.

References Cited

UNITED STATES PATENTS

| | | | |
|---|---|---|---|
| 3,440,064 | 4/1969 | Ludwig | 106—15 |
| 3,228,909 | 1/1966 | Doddo | 260—45.7 |
| 3,140,957 | 7/1964 | Tanabe | 117—6 |
| 2,533,100 | 12/1950 | Flugel | 8—115.5 |
| 3,242,213 | 3/1966 | Preston | 260—558 |
| 3,006,899 | 10/1961 | Hill et al. | 260—78 |

GEORGE F. LESMES, Primary Examiner

B. BETTIS, Assistant Examiner

U.S. Cl. X.R.

8—115.6; 117—138; 260—78